Jan. 8, 1924.
C. M. BOLICH
1,480,343
WINDSHIELD WIPER
Filed May 24, 1922    2 Sheets-Sheet 1
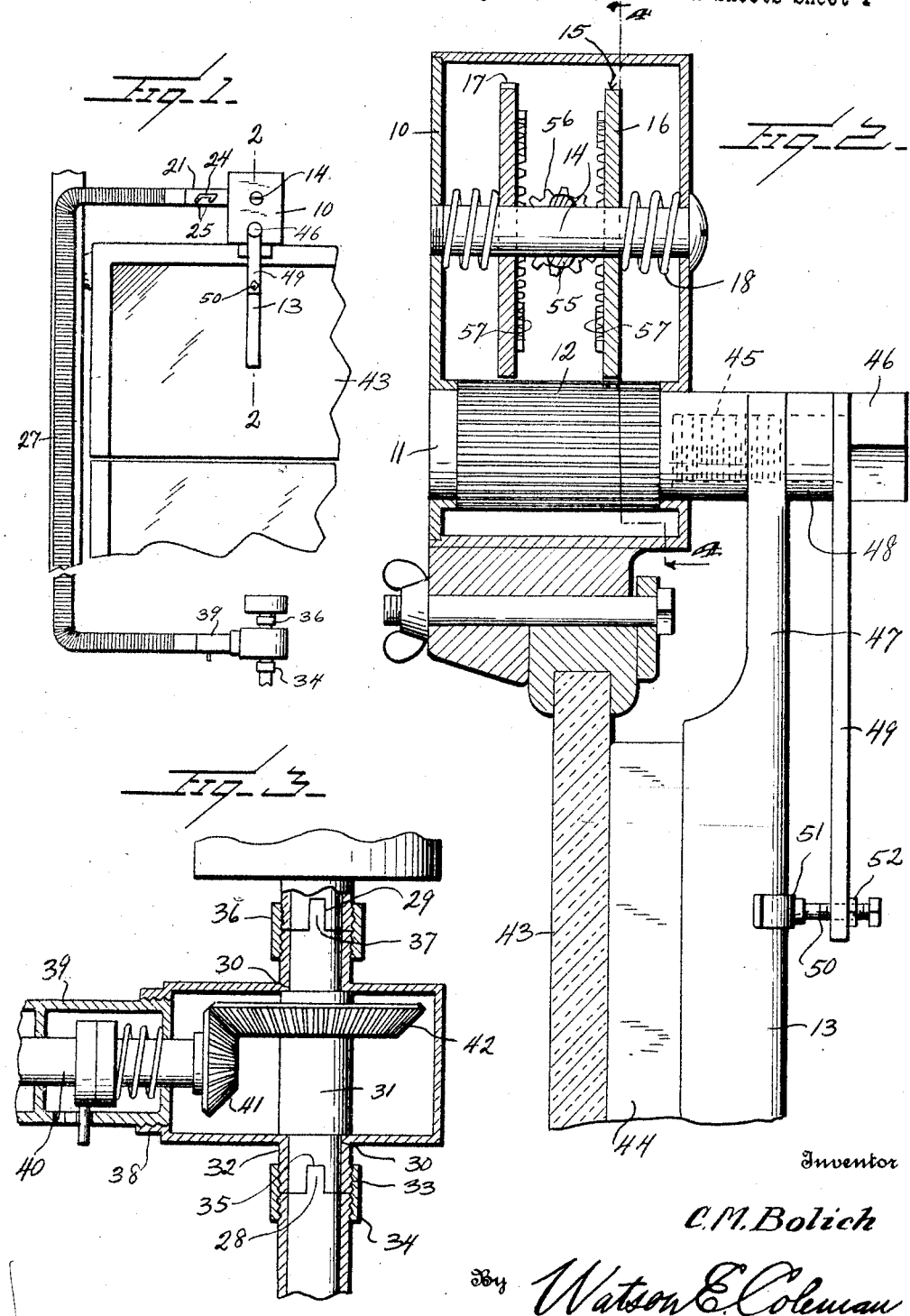
Inventor
C. M. Bolich
By Watson E. Coleman
Attorney

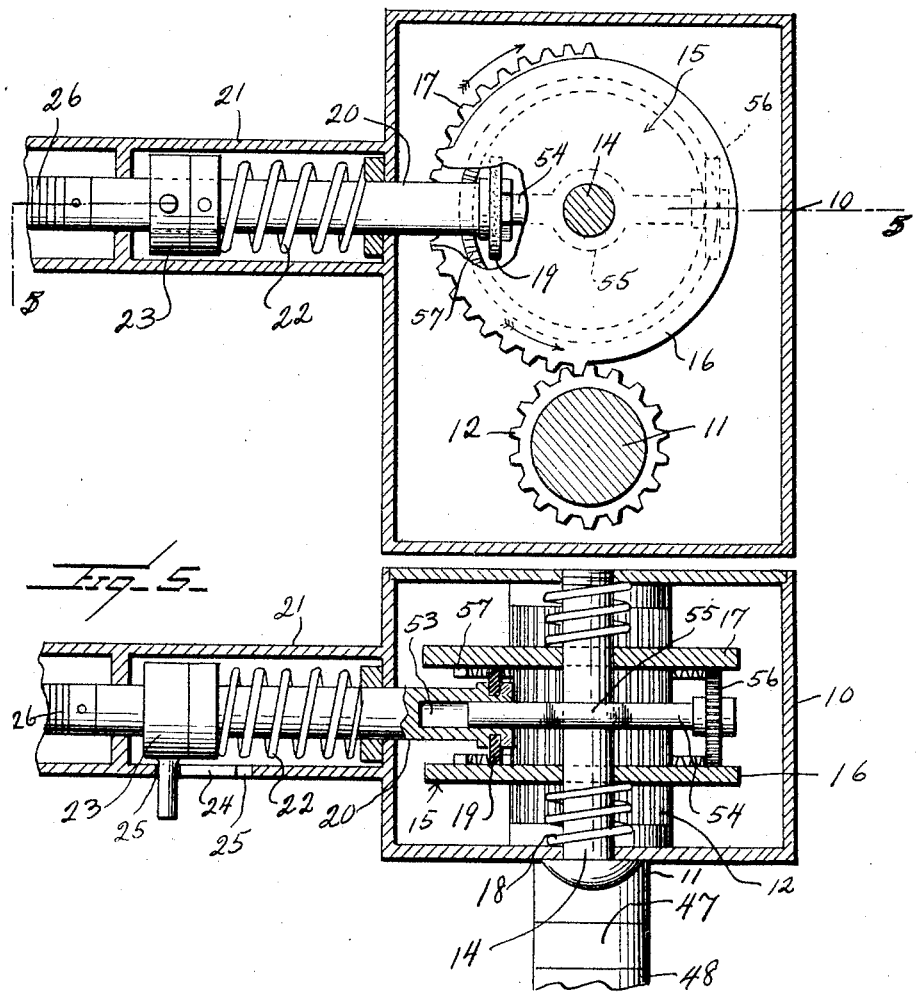

Patented Jan. 8, 1924.

1,480,343

UNITED STATES PATENT OFFICE.

CHARLES M. BOLICH, OF ALLENTOWN, PENNSYLVANIA.

WINDSHIELD WIPER.

Application filed May 24, 1922. Serial No. 563,327.

*To all whom it may concern:*

Be it known that I, CHARLES M. BOLICH, a citizen of the United States, residing at Allentown, in the county of Lehigh and State of Pennsylvania, have invented certain new and useful Improvements in Windshield Wipers, of which the following is a specification, reference being had to the accompanying drawings.

This invention relates to improvements in windshield wipers, and an important object of the invention is to provide a novel and improved driving apparatus therefor.

A further object of the invention is to provide means whereby the wiper is held in firm engagement with the glass of the windshield.

A still further object is to provide means for holding the wiper in firm engagement with the windshield glass which is adjustable, thereby permitting compensation for wear of the pad of the wiper during use.

An additional object of the invention is to provide means whereby the windshield wiper may be driven by the flexible shaft driving the speedometer of the automobile.

These and other objects I attain by the construction and arrangement shown in the accompanying drawings wherein for the purpose of illustration is shown a preferred embodiment of my invention and wherein like reference characters designate like parts throughout.

In the drawings:

Figure 1 is a fragmentary front elevation showing a wiper constructed in accordance with my invention applied to a windshield;

Figure 2 is an enlarged sectional view showing the construction of the drive apparatus and of the mounting of the wiper element;

Figure 3 is a sectional view showing the manner of connecting the drive with the speedometer;

Figure 4 is an enlarged sectional view on the line 4—4 of Figure 2; and

Figure 5 is a section on the line 5—5 of Figure 4.

Referring now more particularly to the drawings, the numeral 10 designates a casing in which is rotatably mounted a shaft 11 formed within the casing with gear teeth 12 and having one end thereof projecting without the casing and attached to an oscillatory wiper element 13 of any suitable construction.

Rotatably mounted within the casing upon a suitable shaft 14 is a driving assembly 15 comprising a pair of mutilated gears 16 and 17, the teeth of which are adapted to alternately engage with the teeth 12 of the shaft 11, and which gears are adapted for independent driving. Means 18 are provided tending to force the gears 16 and 17 toward one another and into engagement with the opposite sides of a friction disk 19 which is mounted upon a shaft 20 extending through the wall of the casing 10 and shiftable therethrough so that it may be moved toward or away from the center of the gears. This shaft has its end portion extended through an adjustment casing 21 against one end of which a spring 22 abuts, the opposite end of the spring being engaged with a stop member 23 carried by the shaft so that the shaft is normally held in one adjusted position. A shifter member is provided, preferably an end of the abutment member 23, extending through a slot 24 formed in the adjustment casing 21, and which slot is provided in its side walls with angular coves 25 inclining away from the end wall of the adjustment casing 21 against which the spring abuts.

By shifting the adjustment member within the slot and engaging it with a selected cove, the speed of rotation of the gears 16 and 17 may be governed. It will, of course, be obvious that the rotation of these gears will be in opposite directions and that accordingly the intermittent engagement of the teeth thereof with the teeth 12 of the shaft 11 will cause oscillation of the shaft 11 and of the wiper carried thereby.

The outer extremity of the shaft 20 is engaged with an end of a flexible shaft 26 disposed within the usual flexible casing 27, and the end of this flexible shaft may be driven from any suitable source. Where the vehicle to which the windshield wiper is attached is provided with a speedometer, I prefer that this flexible shaft shall be driven from the speedometer shaft by an organization such as shown in Figure 3. As is well known to those familiar with the art, the end of a speedometer shaft is provided with an outstanding tongue 28 which is adapted for engagement in a socket 29 forming a part of the speedometer. In accordance with my invention I provide a casing provided in the side walls thereof with openings 30 through which are directed the ends of a shaft 31, the sides of the openings being provided with flanges 32. The outer end of one of these flanges is externally screw-threaded, as indicated at 33, for engagement with the attachment collar 34 of the speedometer drive shaft. The end of the shaft which extends through the last named opening has formed therein a socket 35 for the reception of the tongue 28 of the speedometer drive shaft. The other of the flanges has mounted thereon an attachment collar 36 similar to the attachment collar of the speedometer drive shaft and the adjacent end of the shaft is provided with a tongue 37 similar to the tongue of the speedometer drive shaft and adapted for engagement in the drive receiving socket 29 of the speedometer. The casing is provided at one end thereof with means, as at 38, for attaching thereto a casing 39 in which a shaft 40 is adjustably mounted after the manner of the adjustment casing 21 hereinbefore described. The end of this shaft is provided with a gear 41 which is adapted for engagement with a gear 42 carried by the shaft 31 and by adjusting the shaft 40 may be moved into or out of engagement with this gear so that the shaft 40 is driven or no, as may be desired. The outer end of the shaft 40 is secured to the flexible shaft 26 to transmit the drive thereto.

In order that the wiper 13 may be held in firm engagement with the windshield glass 43 and to provide means for compensating for the wear of the pad 44 due to its engagement with the glass, I provide in the end of the drive shaft 11 a bore 45 with which is engaged a set screw 46. Upon this set screw, intermediate the shaft 11 and the head thereof, I mount a wiper arm 47, a sleeve 48 abutting the wiper arm, and a strip of spring steel 49 disposed between the head of the set screw 46 and the sleeve 48, the set screw being employed for tightening all of these elements to prevent relative rotation thereof with relation to the shaft. The strip of spring steel 49 will extend in the same direction as the wiper 13 and is provided in the end thereof with a screw 50 having threaded engagement therewith and provided at its end with a swivel foot 51 straddling the back of the wiper. This screw may be secured in adjusted position by means of a lock nut 52 or the like. It will be obvious that upon the pad wearing, additional tension may be placed thereon by adjusting the screw 50 so that the pad will at all times be kept in firm engagement with the glass to wipe the moisture therefrom.

It will be obvious to those familiar with the art that the frictional engagement of the wiper with the glass will exercise such a dragging effect upon the shaft 11 that there would be a tendency of the friction driven elements 16 and 17 to lag, particularly at the time when the direction of rotation was reversed, and that this lag would cause a certain slippage which would eventually result in the gear teeth of the members 16 and 17 simultaneously engaging with the teeth 12 of the shaft 11, locking the shaft 11 against movement and possibly resulting in breakage. In order that the danger of this slippage may be avoided and at the same time the end of the shaft 20 fully supported so as to prevent any unusual strain thereon, I provide in the end of the shaft 20 a bore 53 in which bore is slidably mounted one end of a support shaft 54. This shaft is provided intermediate its ends with a yoke 55 embracing rotatably the shaft 14. The opposite end of the shaft 54 has rotatably mounted thereon a gear 56 which meshes with gear teeth 57 formed upon the adjacent faces of the mutilated gears 16 and 17. It will be obvious that the gear 56 will synchronize the rotation of the mutilated gears 16 and 17 and effectually prevent simultaneous engagement of the gear teeth thereof with the gear teeth 12 of the shaft 11.

From the foregoing it is believed to be obvious that a device constructed in accordance with my invention provides a novel drive for the wiper, affording means for adjusting the speed of movement of the wiper. It will also be obvious that means are provided whereby the drive for the wiper may be obtained from the speedometer drive without in any manner interfering with the speedometer drive, and means likewise provided for maintaining the wiper in proper engagement with the windshield at all times. Since many changes are possible in the shape, size and arrangement of the parts herein described without materially departing from the spirit of my invention, I accordingly do not limit myself to such specific structure except as hereinafter claimed.

I claim:—

1. In a drive for windshield wipers, the combination with a geared wiper shaft, of a pair of synchronously rotatable mutilated gears engaged with the wiper shaft, means for oppositely rotating said gears embodying a drive shaft, and means connecting the drive shaft and gears for adjustably regulating the relative speeds thereof.

2. In a drive for windshield wipers, a wiper shaft, a pair of synchronously rotatable elements having alternate intermittent engagement with the wiper shaft to drive the same, means for oppositely rotating said members comprising a friction disk disposed between the members, means for maintaining the members in engagement with the friction disk, and means for adjusting the friction disk toward or away from the rotative axes of the members.

3. In a drive for windshield wipers, a pair of synchronously rotatable elements, a friction disk disposed between the elements, means for maintaining the elements in engagement with the friction disk, a drive for the friction disk, means connecting the drive and friction disk whereby said friction disk may be adjusted toward or away from the rotative axes of the elements comprising a casing, an abutment member within the casing, a spring disposed between one end of the casing and the abutment member, a slot formed in the casing, a member connected with the shaft and extending through the slot, and coves formed in a side wall of the slot and inclining away from the spring engaged wall of said casing.

4. In a drive for windshield wipers, the combination with a geared wiper shaft, of a second shaft, a drive shaft embodying a friction gear adjustable toward and away from the second shaft, a pair of rotatable mutilated gears mounted upon the second shaft, means for forcing said gears into engagement with the friction element of the drive shaft, and means for synchronizing the rotation of said mutilated gears.

5. In a drive for windshield wipers, the combination with a geared wiper shaft, of a second shaft, a drive shaft embodying a friction gear adjustable toward and away from the second shaft, a pair of rotatable mutilated gears mounted upon the second shaft, means for forcing said gears into engagement with the friction element of the drive shaft, means for synchronizing the rotation of said mutilated gears including gears formed upon adjacent faces of the mutilated gears, and a gear rotatably engaged with each of said gears.

6. In a drive for windshield wipers, the combination with a geared wiper shaft, of a second shaft, a drive shaft embodying a friction gear adjustable toward and away from the second shaft, a pair of rotatable mutilated gears mounted upon the second shaft and engaging the geared wiper shaft, means for forcing said gears into engagement with the friction element of the drive shaft, means for synchronizing the rotation of said mutilated gears, including a shaft provided centrally with a yoke receiving said second shaft, said drive shaft having a bore formed in the end thereof receiving one end of the last named shaft, gears formed on adjacent faces of said mutilated gears, and a gear mounted on the opposite end of the last named shaft and engaging with each of the last named gears.

7. In a windshield wiper, a drive including a casing, a wiper shaft mounted for oscillation in the casing, a stationary shaft mounted adjacent the wiper shaft and in opposed walls of the casing, a drive shaft slidably and rotatably directed through the wall of the casing and adjustable toward and away from the second shaft, rotatable mutilated gears mounted upon the stationary shaft at opposite sides of said drive shaft, a friction element upon the drive shaft adapted to engage with adjacent faces of the mutilated gears, springs surrounding said second shaft intermediate the casing walls and the mutilated gears and forcing said mutilated gears into engagement with said friction element, means for synchronizing said mutilated gears and a driving connection between said wiper shaft and said mutilated gears.

8. In a windshield wiper, a drive including a casing, a wiper shaft mounted for oscillation in the casing, a stationary shaft mounted adjacent the wiper shaft and in opposed walls of the casing, a drive shaft slidably and rotatably directed through the wall of the casing and adjustable toward and away from the second shaft, rotatable mutilated gears mounted upon the stationary shaft at opposite sides of said drive shaft, a friction element upon the drive shaft adapted to engage with adjacent faces of the mutilated gears, springs surrounding said second shaft intermediate the casing walls and the mutilated gears and forcing said mutilated gears into engagement with said friction element, means for synchronizing said mutilated gears, including a shaft having a yoke embracing said second shaft intermediate said mutilated gears and having one end thereof engaged in the bore formed in the inner end of said drive shaft, annular gears formed on adjacent faces of said mutilated gears, and a gear carried by said yoke shaft and engaging with each of said annular gears and a driving connection between said wiper shaft and said mutilated gears.

In testimony whereof I hereunto affix my signature.

CHARLES M. BOLICH.